Nov. 23, 1965

V. L. HEEREN

MULTIPORT HYBRID COUPLING DEVICE FOR WAVE TRANSMISSION SYSTEMS

Filed Aug. 12, 1963

3,219,949

INVENTOR
Vernon L. Heeren
BY
Herbert W. Arnold
ATTORNEY

United States Patent Office 3,219,949

Patented Nov. 23, 1965

3,219,949

MULTIPORT HYBRID COUPLING DEVICE FOR WAVE TRANSMISSION SYSTEMS

Vernon L. Heeren, Wayland, Mass., assignor to Raytheon Company, Lexington, Mass., a corporation of Delaware Filed Aug. 12, 1963, Ser. No. 301,463

3 Claims. (Cl. 333—10)

The present invention relates to wave energy coupling devices, and more particularly to passive type devices for directionally coupling a plurality of wave transmission circuits.

In many high-frequency circuit applications, such as in radar receiving and transmitting systems, for example, the need arises for coupling a plurality of input and output circuits in a manner such that power can be coupled from one input circuit into one or more output circuits without power being coupled into other input circuits.

One type of coupling device which has been proposed in the prior art for coupling plural input circuits to plural output circuits while isolating the plural input circuits from one another is known in the art as a microwave hybrid. In the case of an odd number of plural output circuits in general it can be said that such coupling devices require the asymmetrical use of frequency sensitive lengths of transmission line to achieve the proper phase relationships for efficient isolation of the various signal inputs. This asymmetry in the frequency sensitive lengths of transmission line produces a very limiting effect on the operational bandwdith of the coupling device.

It is a principal object of the present invention to provide a multiple-port directional coupler device comprising a symmetrical network of transmission line elements that provides coupling between input and output ports and isolation between input ports and which has a relatively large operating bandwidth.

In accordance with the present invention, a five-port directional coupler is provided comprising a two-mesh wave energy transmission network having six junctions interconnected with equal length odd-multiple quarter wavelength branches. The integral network is symmetrical about a central branch which is shared by both meshes. The central branch connects a common input central junction with a common output central junction. First and second input ports are connected to the non-common input junctions and three output ports are separately connected to three separate output junctions. The characteristic impedances of the branch lines are all equal except for the common central branch. When series junctions are utilized, the impedance of the central branch line is made twice the value of the other branch lines and when shunt junctions are employed, the impedance of the central branch is chosen to be half the value of the other branch lines. In both cases the power delivered to the central output port is twice the value of the power delivered to each of the other two ports.

Other objects, features and advantages of the present invention will be apparent from the following more particular description of a preferred embodiment of the invention, as illustrated in the accompanying drawing, in which.

Figure 1:
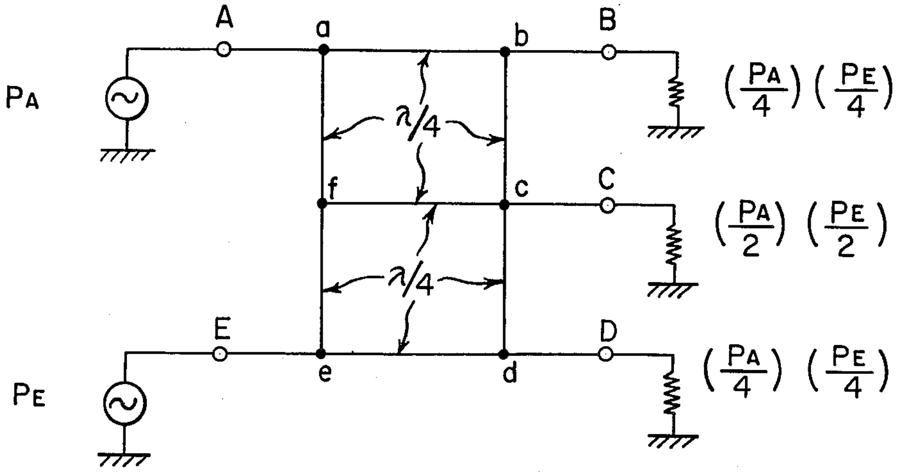
FIG. 1 is a schematic diagram illustrating a five-port directional coupler embodying the principles of the present invention.

Referring now to FIG. 1, there is shown in line diagram form a five-port directional coupler having input ports A and E and output ports B, C and D. Power is supplied to input ports A and E by generators $P_A$ and $P_E$ as shown and the power from these separate generators is delivered to the output loads connected to ports B, C and D in the ratio of 1:2:1. In other words, input power from generator $P_A$ is coupled to the output loads connected to ports B, C and D with one-quarter of the power being delivered to load B, one-half to load C and one-quarter to load D. In like manner, power from generator $P_E$ is distributed to the same loads attached to B, C and D with one-quarter of the power being delivered to the load connected to B, one-half to C and one-quarter to D.

In the preferred embodiment of the invention, a five-port coupler is formed by interconnecting equal lengths of electromagnetic wave transmission line at six spaced junctions to form a two-mesh integral network. The transmission line branches may comprise any of the well known devices such as waveguides, strip-type transmission lines, coaxial cable, bi-axial balanced line, etc. The line lengths of the branches connecting junctions *a*, *b*, *c*, *d*, *e* and *f* are all equal and may be any odd-multiple of a quarter wavelength line. For explanatory purposes, each of the branch lines has been chosen to be one-quarter wavelength. The lines A*a*, E*e*, B*b*, C*c* and D*d* may have any desired length.

The characteristic impedance $Z_0$ of each of the transmission line elements is selected to be the same except for lines *fc* and *c*C. As will be explained in greater detail below, the characteristic impedance of these lines is chosen to be $Z_0/2$ when shunt-type junctions are used and $2Z_0$ when series-type junctions are employed. The junctions *a*, *b*, *c*, *d*, *e* and *f* must be either all of the shunt-type or all of the series-type. Typically, with shunt-type junctions the transmission line elements are of the unbalanced type such as the well known coaxial line or any of the types employing a single conductor disposed between parallel ground planes. With series-type junctions, the branch lines are typically of the balanced type such as bi-axial line or any of the transmission lines using two conductors, either with or without grounded shields. The series-type junction is also typically used with waveguides.

Operation of the five-port directional coupler provided by the present invention will now be described in greater detail by referring to FIGS. 2 and 3 which show a coupler using series-type junctions at *a*, *b*, *c*, *d*, *e* and *f*. Junctions *a*, *f* and *e* are identified as input junctions and *b*, *c* and *d* are output junctions. Although proof of the performance for the entire coupling network may be established by developing a scattering matrix for the five-port circuit, a greatly simplified method of proof, made possible by the symmetrical nature of the network, will be utilized herein. The theory of this analytical method is described in an article entitled, "A Method of Analysis of Symmetrical Four-Port Networks," written by J. Reed and G. J. Wheeler, IRE Transactions On Microwave Theory and Techniques, volume MTT–4, Number 4, October, 1956.

Since the coupling network of the present invention is symmetrical, performance will be described beginning with the assumption that signal power is applied only to port A. As shown in FIG. 2, an input signal voltage 2V is applied to port A comprising two vectors +V having the same magnitude and phase. Assuming an input impedance $Z_0$, the power entering port A is equal to $4V^2/Z_0$. For purposes of analysis, it is further assumed that a zero signal is applied to port E comprising a voltage vector +V (which is in phase with the signal +V entering port A) and a voltage vector −V (which is out of phase with the +V vector entering A). The resulting action of the +V signal at A combined with the +V signal at E is hereinafter referred to as the even mode operation, and the action of the other +V input signal at A combined with the −V signal input at E is hereinafter referred to as the odd mode of operation.

In the odd mode of operation, the +V and −V signals from A and E, respectively, arrive at junction points *f* and *c* in such a phase as to nullify one another and, accordingly, prevent the coupling of energy into lines *fc* and *c*C. For the network utilizing series-type junctions as illustrated in FIG. 2, the reflections at *f* and *c* are the same as if the junctions were open circuits. The open circuits at *f* and *c* are transformed by the quarter wavelength lines *af*, *bc*, *fe* and *cd* as short circuits which appear in series with the lines from A to B and E to D. Thus, energy flows from A to B and E to D without impedance mismatch, and the amount of power delivered to each of the output ports B and D (properly terminated) is equal to $V^2/Z_0$, i.e. one-quarter of the input power $4V^2Z_0$. Since the input voltages are 180° out of phase for the odd mode operation, the voltage at output port D is 180° out of phase with respect to the voltage at port B; and since the length of line AB is one-quarter wavelength, the signal at B lags the signal at A by 90°.

For a five-port coupler device utilizing shunt-type junctions, reflections at *f* and *c* are the same as if there were short circuits at *f* and *c* which, in turn, appear as open circuits in the shunt arms at *a, b, d* and *e*. In other words, the short circuits at *f* and *c* are effectively transformed to appear as open circuits in the shunt arms at the junctions *a, b, d* and *e*. Accordingly, no energy is coupled into lines *fc* and *c*C and the overall operation is the same as with the coupling device employing series-type junctions described above.

Figure 2:
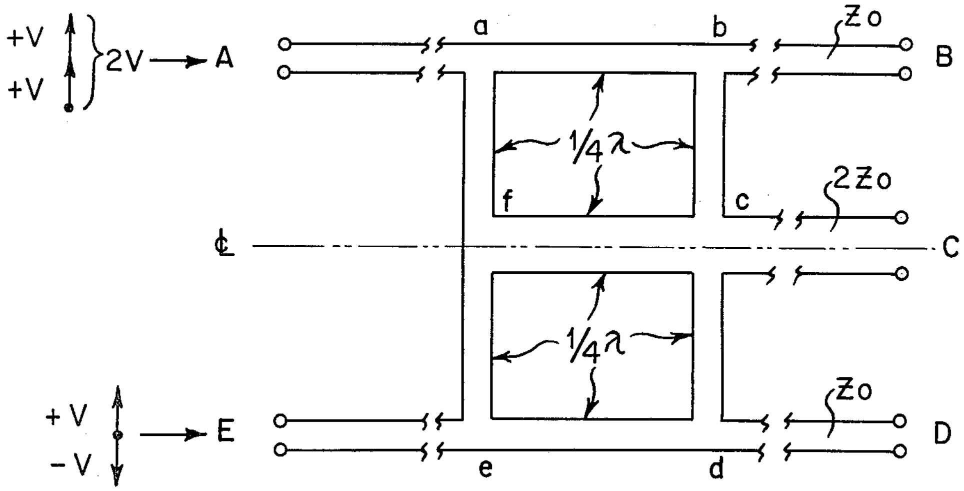
FIG. 2 is a schematic drawing illustrating a five-port directional coupler utilizing series junctions.

Since the directional coupler device of the present invention is completely symmetrical about the common central branch *fc*, further operational analysis of the network will be explained by dividing the circuit in half along the center line ℄ through transmission line *fc*C as shown in FIG. 2. Analysis of the even mode may be evaluated by considering either half of the circuit. For purposes of the explanation herein, the upper half circuit including input port A and output ports B and C, as illustrated in FIG. 3, will be considered. With the transmission section *fc*C split down the middle, the impedance of this line becomes the same as the characteristic impedance for each of the other sections. For series-type junctions, this means that the splitting action changes the charatceristic impedance of lines *fc* and *c*C from $2Z_0$ to $Z_0$ and for shunt-type junctions, the charateristic impedance is increased from $Z_0/2$ to $Z_0$.

Figure 3:
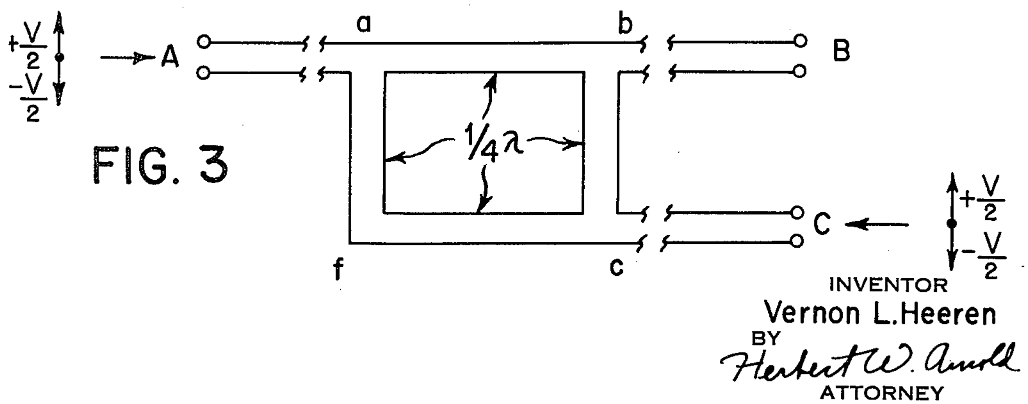
FIG. 3 is a schematic diagram showing a symmetrical half circuit of the coupling network illustrated in FIG. 2.

Referring now to FIG. 3, it is seen that this half circuit is symmetrical about the junctions *b* and *f* and that the operation of this circuit may now be analyzed in terms of an even mode and an odd mode operation as utilized above in connection with evaluation of the entire circuit shown in FIG. 2.

In the analysis of FIG. 2 described above, it will be recalled that one of the input voltage vectors +V was utilized for the even mode operation and the other was utilized for the odd mode operation. In now analyzing the half circuit shown in FIG. 3, it will be assumed that the even mode +V input is now divided into two signal components $+V/2$ and $+V/2$, and it will be further assumed that a corresponding zero signal is applied to output port C which is designated as $+V/2$ and $-V/2$. In the odd mode of operation, signals from A and C arrive at *b* and *f* out of phase. In a coupler using shunt junctions, these junctions appear as short circuits at *b* and *f* and the short circuits are transformed to open circuits at *a* and *c* by the quarter wavelength branch lines. The open circuits at *a* and *c* create reflections of $+V/2$ at *a* and $-V2$ at *c*. With a coupler using series junctions, the same reflections of $+V/2$ at *a* and $-V/2$ at *c* are obtained. This is due to the fact that with the series junctions, the junction at *f* appears as a short circuit but the junction at *b* does not. However, since the short circuit at *f* transforms to an open circuit at *a* and *c*, the short circuit at *f*, which is transformed to an open circuit at *a* and *c*, creates reflections of $+V/2$ at *a* and $-V/2$ at *c*. Thus the network performance is the same for both types of junctions.

Considering next the even mode of operation, the $+V/2$ signals arrive at *b* and *f* in phase. For shunt-type junctions, this simulates an open circuit at *f* but not at *b*. The open circuit at *f* transforms to a short circuit at *a* and at *c* causing reflections of $-V/2$ at *a* and $-V/2$ at *c*. For the series-type junction, junctions *b* and *f* simulate open circuits which transform to short circuits at *a* and *c* creating reflections of $-V/2$ at *a* and $-V/2$ at *c* in the same manner as with the shunt junction coupler.

Thus it will be seen that with the combined even mode and odd mode operations, the two voltage reflections at *a* are out of phase, and hence cancel, while those voltage reflections at *c* are in phase and hence add. Thus the entire signal entering A is transmitted to C, nothing being reflected back to the input port A and nothing being transmitted to output port B. The phase angle of the signal voltage at C lags the input signal at *a* by 180° (i.e. due to delay in one-half wavelength line sections).

In recombining the two half circuits, it will be seen that the voltage at output port C remains the same for shunt junctions but doubles for series junctions. Thus the total power output at port C is $V^2/\frac{1}{2}Z_0$ for the shunt junction-type coupler and $4V^2/2V_0$ for the series junction-type coupler. In each case, the output power at C is equal to $2V^2/Z_0$. Thus, as indicated above, one-half of the input power supplied to port A is delivered to port C and one-quarter of the input power to A is delivered to each of the output ports B and D.

It will be appreciated by those skilled in the art that the five-port directional coupler provided by the present invention may be utilized to great advantage in a number of applications where plural signal input sources must be isolated from one another and, at the same time, the signal supplied to the plural inputs must be coupled to plural outputs.

While the invention has been particularly shown and described with reference to a preferred embodiment thereof, it will be understood by those skilled in the art that various changes in form and details may be made therein without departing from the spirit and scope of the invention.

I claim:

1. Directional coupler apparatus adapted to transmit wave energy of a desired wavelength from first and second input ports to third, fourth and fifth output ports without transmitting energy between said first and second input ports, said apparatus comprising an integral two-mesh symmetrical electrical network having six junctions interconnected with equal length one-quarter wavelength branch lines, three of said junctions being input junctions and three being output junctions, one of said branch lines being central and common to both meshes and connecting a common input central junction with a common output central junction; said branch lines having the same characteristic impedance except for the central common branch; means for separately connecting each of said output ports to a separate one of said output junctions, matching utilization load means terminating each of said output ports, and means for connecting a wave energy generator to at least one of the non-common input junctions whereby one-half the power input from said generator is delivered to the output port load connected to said output central junction and one-quarter of the input power is delivered to each of the other output port loads.

2. Directional coupler apparatus according to claim 1 characterized in that each of said junctions is of the series-type and the central common branch line has a characteristic impedance twice the value of the other branch lines.

3. Directional coupler apparatus according to claim 1 wherein each of said junctions is of the shunt-type and the central common branch line has a characteristic impedance one-half the value of the other branch lines.

References Cited by the Examiner

UNITED STATES PATENTS

| | | | |
|---|---|---|---|
| 2,614,170 | 10/1952 | Marie | 333—10 |
| 2,975,381 | 3/1961 | Reed et al. | 333—10 |

OTHER REFERENCES

Reed et al.: "A Method of Analysis of Symmetrical Four-Port Networks" IRE Transactions of Microwave Theory and Techniques, vol. MTT-4, Oct. 1956.

References Cited by the Applicant

UNITED STATES PATENTS

| | | |
|---|---|---|
| 2,445,895 | 7/1948 | Tyrrell. |
| 2,808,573 | 10/1957 | DeBell. |
| 2,831,168 | 4/1958 | Smoll. |
| 2,984,797 | 5/1961 | Wheeler. |
| 3,012,210 | 12/1961 | Nigg. |

HERMAN KARL SAALBACH, *Primary Examiner.*